United States Patent [19]

Setani

[11] Patent Number: 5,187,358
[45] Date of Patent: Feb. 16, 1993

[54] IMAGE READING DEVICE HAVING A TELECENTRIC OPTICAL SYSTEM AND A BLAZED DIFFRACTION GRATING

[75] Inventor: Michitaka Setani, Kawasaki, Japan

[73] Assignee: Canon Kabushiki Kaisha, Tokyo, Japan

[21] Appl. No.: 884,239

[22] Filed: May 11, 1992

Related U.S. Application Data

[63] Continuation of Ser. No. 479,761, Feb. 9, 1990, abandoned.

[30] Foreign Application Priority Data

Feb. 15, 1989 [JP] Japan ................................. 1-035692

[51] Int. Cl.$^5$ ............................................. H01J 40/14
[52] U.S. Cl. .................................. 250/208.1; 250/226
[58] Field of Search .................... 250/208.1, 216, 226; 350/162.22; 358/482, 483; 359/571

[56] References Cited

U.S. PATENT DOCUMENTS

| | | | |
|---|---|---|---|
| 3,658,423 | 4/1972 | Elliott | 356/98 |
| 4,011,009 | 3/1977 | Lama et al. | 350/162 R |
| 4,079,411 | 3/1978 | Engelbrecht et al. | 350/162.22 |
| 4,105,290 | 8/1978 | Quinn | 350/168 |
| 4,204,881 | 5/1980 | McGrew | 350/162.22 |
| 4,264,921 | 4/1981 | Pennington et al. | 358/50 |
| 4,277,138 | 7/1981 | Dammann | 350/162 R |
| 4,444,472 | 4/1984 | Tanaka | 350/423 |
| 4,540,996 | 9/1985 | Saito | 346/140 R |
| 4,580,060 | 4/1986 | Takashi | 250/208.1 |
| 4,641,944 | 2/1987 | Honda et al. | 355/1 |
| 4,708,436 | 11/1987 | Kleinknecht | 350/162.22 |
| 4,870,268 | 9/1989 | Vincent et al. | 250/226 |
| 4,886,341 | 12/1989 | Oishi et al. | 350/162.22 |
| 4,926,041 | 5/1990 | Boyd | 250/226 |
| 4,959,541 | 9/1990 | Boyd | 250/237 R |

FOREIGN PATENT DOCUMENTS

| | | |
|---|---|---|
| 0167747 | 1/1986 | European Pat. Off. . |
| 0240000 | 10/1987 | European Pat. Off. . |
| 0302230 | 2/1989 | European Pat. Off. . |
| 2645075 | 4/1978 | Fed. Rep. of Germany . |

OTHER PUBLICATIONS

Applied Optics article entitled "Color Separation Gratings", vol. 17, No. 15, Aug. 1, 1978, pp. 2273–2279.

*Primary Examiner*—David C. Nelms
*Attorney, Agent, or Firm*—Fitzpatrick, Cella, Harper & Scinto

[57] ABSTRACT

An image reading device includes a plural-line sensor containing plural line sensor arrays formed on a substrate, a telecentric imaging optical system for forming the image of an object on the sensor, and a blazed diffraction grating positioned in the optical path between the imaging optical system and the sensor and adapted to separate the light from the object into plural color components and to guide the color-separated light to respectively corresponding sensor arrays.

24 Claims, 4 Drawing Sheets

SUB SCANNING SECTION

MAIN SCANNING SECTION

SUB SCANNING SECTION

SUB SCANNING SECTION

SUB SCANNING SECTION

MAIN SCANNING SECTION
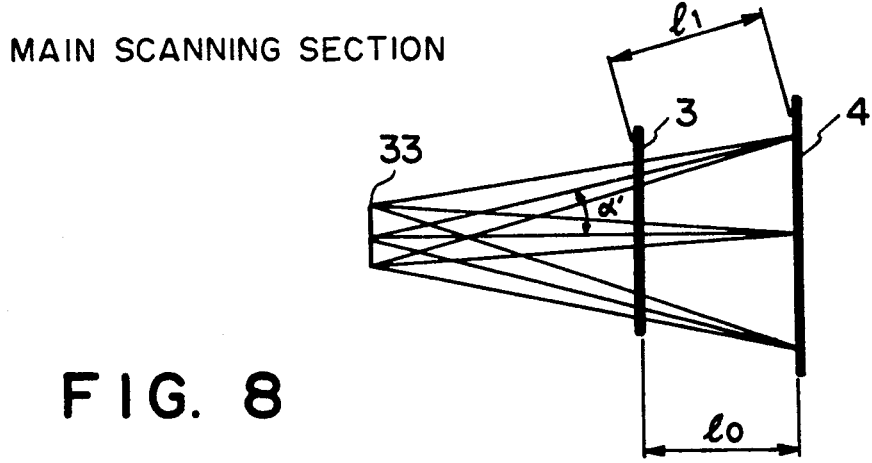
FIG. 8
SUB SCANNING SECTION
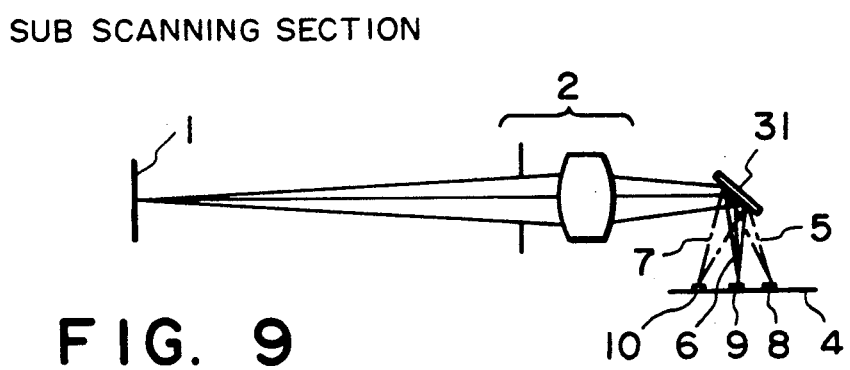
FIG. 9
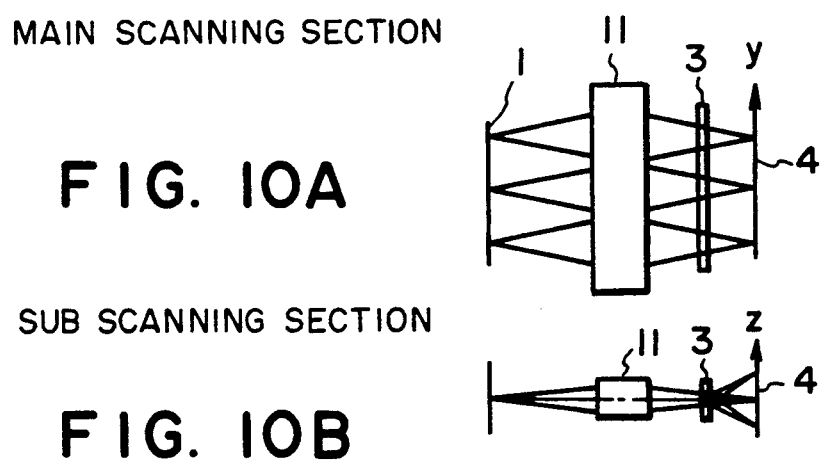
MAIN SCANNING SECTION
FIG. 10A
SUB SCANNING SECTION
FIG. 10B

IMAGE READING DEVICE HAVING A TELECENTRIC OPTICAL SYSTEM AND A BLAZED DIFFRACTION GRATING

This application is a continuation of application Ser. No. 07/479,761 filed Feb. 9, 1990, now abandoned.

BACKGROUND OF THE INVENTION

1. Field of the Invention

The present invention relates to a device for reading a color image utilizing a solid-state image sensor device or the like, and in particular to a color image reading device in which the light from an object is guided to a sensor such as a solid-state image sensor through an imaging optical system and color separation means.

2. Related Background Art

Conventionally a device as shown in FIG. 1 is already known for line scanning an object such as an original document and reading the color image thereof with a solid-state image sensor array, such as a CCD sensor.

The information on a part of an original surface 1 is illuminated by the light from an illuminating light source (not shown), and is read by the reflected light which is guided through an imaging optical system, then is separated into three colors through a three-piece (3P) prism 20 and are focused on three line CCD sensors 21, 22, 23.

However, such conventional structure is inevitably expensive since it requires three independent sensors and the 3P prism requiring high precision in the manufacture thereof. It is also associated with difficulty in manufacture, since the light beams have to be aligned with the sensors 21, 22, 23 independently.

It is therefore conceivable to prepare three line sensors on a same substrate with a certain distance therebetween, thus obtaining a monolithic 3-line sensor 24 shown in FIG. 2. In such a monolithic sensor, the distances $s_1$, $s_2$ between three lines 25, 26 and 27 are on the order of 0.1 to 0.2 mm depending on various manufacturing conditions, and the dimensions $w_1 \times w_2$ of each single photosensor 28 are on the order of $7 \times 7$ $\mu m$ to $10 \times 10$ $\mu m$. FIG. 3 shows a known structure of a color image reading device, utilizing such a monolithic 3-line sensor as the image sensor, wherein, in scanning the information on an original surface 1 in the sub-scanning direction, the light from said surface 1 is guided through an imaging optical system 29, then separated into three light beams of three colors by color-separating beam splitters 30, 31 with a dichroic selective transmission film, and said three light beams are focused on respectively corresponding line sensors of the monolithic 3-line sensor 32.

However, as shown in FIG. 3, a plate thickness t of the beam splitters 30, 31 provides a line distance $2\sqrt{2}t$ on the sensor 32. If said distance is selected on the order of 0.1 to 0.2 mm as explained above, the plate thickness t is about 35 to 70 $\mu m$, which is difficult to achieve in manufacture, in consideration of the surface flatness required.

There is also known a color image reading device employing a blazed diffraction grating instead of the dichroic mirror, as disclosed in the U.S. Pat. No. 4,277,138 corresponding to DE 2645075. Said device employs an optical system involving a blazed diffraction grating for color separation.

However such structure only considers the light coming from a point in the object field, but does not pay any attention to so-called image angle characteristics resulting from the presence of a certain image width in the main scanning direction in the object field.

SUMMARY OF THE INVENTION

In consideration of the foregoing, an object of the present invention is to provide an image reading device not associated with the above-mentioned drawbacks.

In the image reading device of the present invention, the light beam bearing the image information from the object field is guided to plural light sensors through a telecentric imaging optical system and a blazed diffraction grating. This structure is capable of splitting the light from an image with a finite width into plural light beams of different wavelength regions without aberrations in color, and focusing said light beams on respectively corresponding lines of said plural line sensors.

BRIEF DESCRIPTION OF THE DRAWINGS

FIG. 8 is a schematic view showing image formation in a non-telecentric imaging optical system;

FIG. 9 is a view of a second embodiment employing a one-dimensional reflective blazed diffraction grating; and FIGS. 10A and 10B are cross-sectional views of a third embodiment of the image reading device of the present invention, respectively along a main scanning plane and along a sub-scanning plane.

DESCRIPTION OF THE PREFERRED EMBODIMENTS

Figure 1:
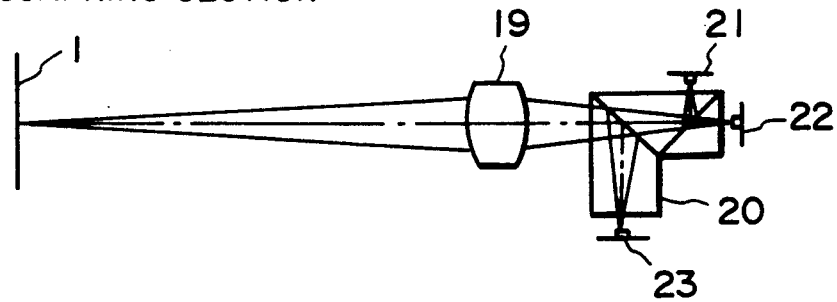
FIGS. 1 and 3 are views showing a conventional color image reading device.
Figure 2:
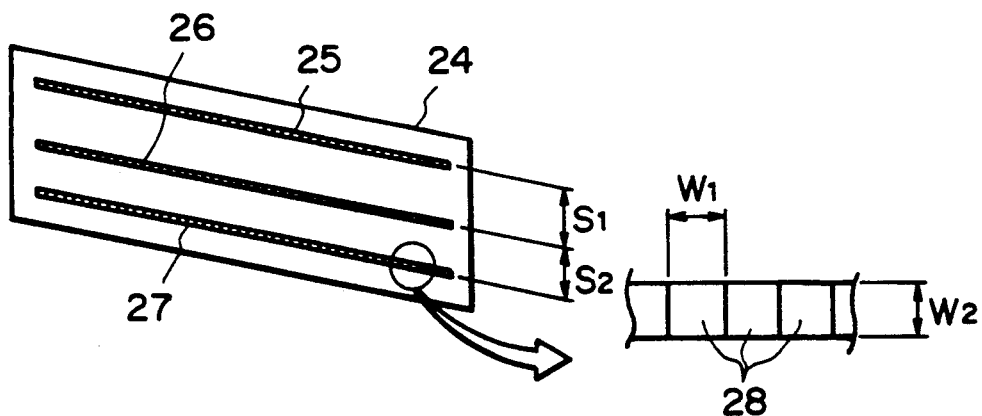
FIG. 2 is a schematic view of a monolithic 3-line sensor.
Figure 3:
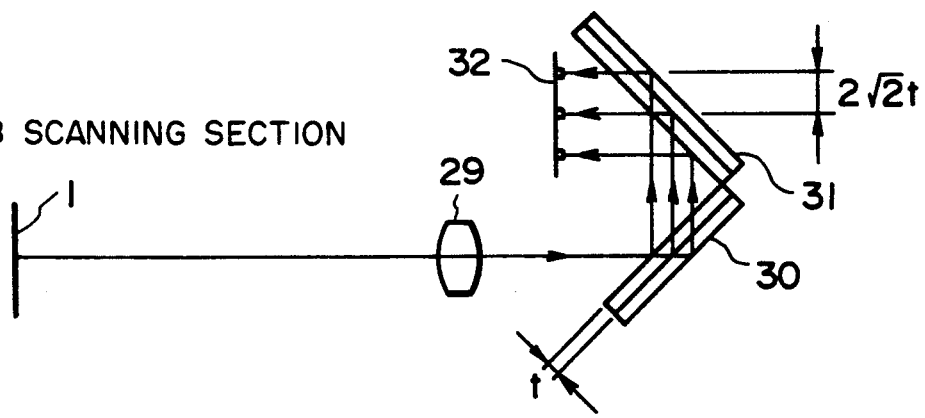
Figure 4:
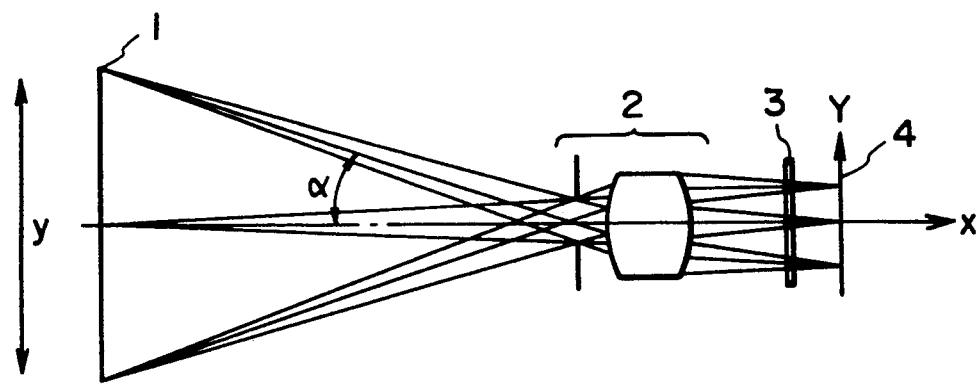
FIG. 4 is a view of a first embodiment of the image reading device of the present invention, along a main scanning plane.
Figure 5:
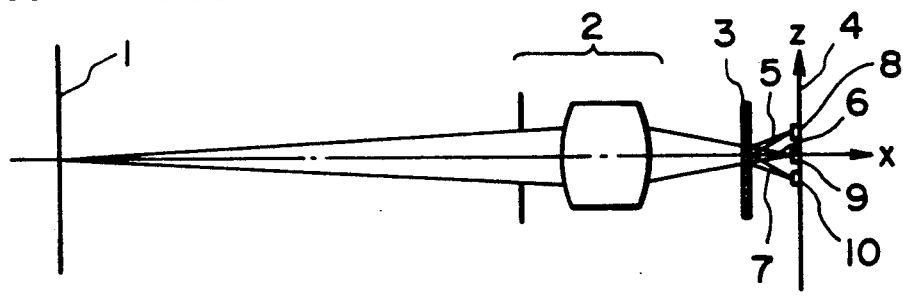
FIG. 5 is a view of the first embodiment shown in FIG. 4, along a sub-scanning plane perpendicular to the main scanning plane.

FIGS. 4 and 5 are cross-sectional views of a first embodiment of the image reading device of the present invention, respectively along a main scanning plane and along a sub-scanning plane perpendicular to said main scanning plane. Image information on an original surface 1 constituting the object is line scanned in a sub-scanning direction Z by means of a mirror (not shown) or the like positioned between said original surface 1 and a telecentric imaging optical system 2, and the light bearing the image information is guided, through said telecentric imaging optical system 2, to a three color-separating two-dimensional blazed diffraction grating 3. The image information on the original surface 1 is read by the relative movement in the sub-scanning direction between the original surface 1 and an image reading unit (imaging optical system 2, diffraction grating 3 and sensor 4). The information-bearing light beam is split in the Z-direction into light beams 5, 6, 7 of three primary colors for image reading, for example red (R), green (G) and blue (B), which are respectively focused on sensor arrays 8, 9, 10 on a monolithic 3-line sensor 4. The sensor-bearing face of the sensor 4 is parallel to the sub-scanning direction.

Each of the sensor arrays 8, 9, 10 of the sensor 4 extends parallel to the main scanning direction, represented as Y in the drawing. Said sensor 4 is a monolithic 3-line sensor provided on a same substrate with three linear sensor arrays which are mutually spaced by a predetermined distance in a direction perpendicular to the direction of said arrays.

The two-dimensional blazed diffraction grating 3 is provided between the imaging optical system 2 and the sensor 4, for separating the light from the object into plural light beams of different colors and guiding said light beams to respectively corresponding sensor arrays.

The original surface 1 is illuminated by an unrepresented light source.

Said two-dimensional blazed diffraction grating has a constant grating pitch in the sub-scanning direction and a constant grating thickness in the main scanning direction.

Figure 6:
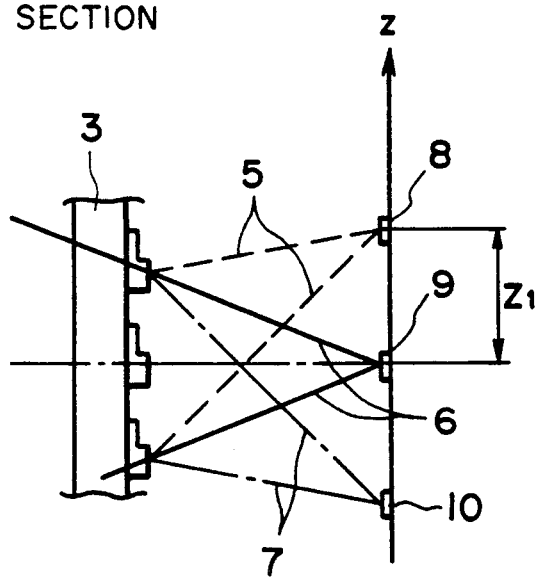
FIG. 6 is a partial magnified view of FIG. 5.
Figure 7:
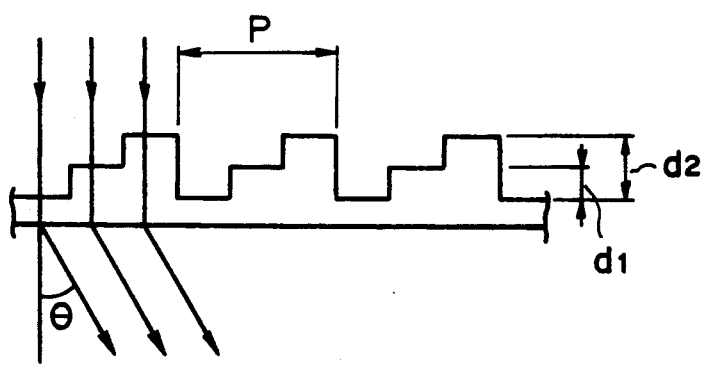
FIG. 7 is a view of a one-dimensional transmissive glazed diffraction grating.

The two-dimensional blazed diffraction grating is disclosed in Applied Optics, 17, 15, p. 2273-2279 (Aug. 1, 1978), and has a structure as shown in FIG. 6 which is a partial magnified view of FIG. 5, and in FIG. 7 showing the structure of a two-dimensional transmissive blazed diffraction grating.

In the present embodiment, because of the use of a telecentric imaging optical system 2, the principal ray always enters the blazed diffraction grating 3 perpendicularly, as shown in FIG. 4, even in the light beam coming from a peripheral area of the finite image reading width y, so that the drawback related to the image angle characteristics is no longer present. FIG. 8 is a schematic view showing image formation in a conventional non-telecentric imaging system.

The above-mentioned point will be explained more detailedly in the following. In practice there is required a certain image reading width y as shown in FIG. 4, so that a certain image angle $\alpha$ is formed with respect to the imaging optical system. Consequently, in the main scanning plane, the principal ray of a light beam coming from an off-axis point enters the imaging optical system with an angle $\alpha$ thereto, and, in an ordinary imaging optical system, emerges with an angle $\alpha'$ from the exit pupil 33 thereof as shown in FIG. 8. Consequently, the distance from the blazed diffraction grating 3 to the array-bearing face of the 3-line sensor 4 is, as shown in FIG. 8, $l_0$ for an axial ray, but is $l_1 = l_0/\cos\alpha'$ for an off-axis ray with an incident angle $\alpha$ and an emerging angle $\alpha'$ from the exit pupil 33. In an ordinary optical system, $\alpha'$ is approximately equal to $\alpha$.

On the other hand, in the blazed diffraction grating 3 with a structure as shown in FIG. 7, the first-order diffraction angle $\theta$ is given by an equation $P\sin\theta = \lambda$ wherein P is the pitch of grating, and $\lambda$ is the wavelength. In an ordinary non-telecentric imaging optical system, the resolving distance $z_1$ on the sensor surface is, as shown in FIG. 6, $z_1 = l_0\tan\theta$ for an axial ray or $z_1 = l_1\tan\theta = l_0\tan\theta/\cos\alpha$ for an off-axis ray, which are mutually different. Consequently the light beams of three colors cannot be properly focused on linear sensor arrays 8, 9, 10.

As an example, in a case of $P = 60$ $\mu$m, $\lambda = 540$ nm (green) and image angle $\alpha \approx \alpha' = 20°$, the aberration between the axial ray and off-axis ray in the Z-direction becomes as large as about 12 $\mu$m, which is apparently in excess of the aforementioned element size of $7 \times 7$ to $10 \times 10$ $\mu$m of the sensor 4. Said aberration can be reduced theoretically by decreasing the image angle $\alpha$, but it cannot be reduced easily in order to make compact the entire device.

There is another drawback resulting from the relation $\alpha \approx \alpha'$. When a principal ray enters the diffraction grating 3 with thicknesses $d_1$, $d_2$ as shown in FIG. 7, with an angle $\alpha'$ in the main scanning direction which is perpendicular to the plane of drawing, the effective optical path length for such an oblique principal ray becomes different from that of a perpendicularly entering principal ray, so that the diffracted wavelength becomes different in these principal rays.

This phenomenon is based on a fact that the phase difference resulting from the thicknesses $d_1$, $d_2$ of the diffraction grating 3 is governed by the following relationship:

$$\Phi_i = 2\pi \left[ \frac{n_\lambda^2}{\sqrt{n_\lambda^2 - \sin^2\alpha'}} - \frac{1}{\cos\alpha'} \right] \times \frac{d_i}{\lambda}, i = 1, 2$$

wherein $\Phi_i$ is the phase difference (rad), and $n_\lambda$ is the refractive index of the medium constituting the grating for the light of wavelength $\lambda$. Thus, the wavelength $\lambda$ providing a desired phase difference $\Phi_i$ in a certain order of diffraction varies with the incident angle $\alpha'$ for a given grating thickness $d_i$. This means that, in reading image information on a line, the wavelength distribution of the light entering each line sensor is shifted as the light moves from the axial position to the off-axis position, thus eventually giving rise to aberration in color.

For example, in case of a blazed diffraction grating of two-stepped structure shown in FIG. 7, with $d_1 = 3100$ nm, $d_2 = 6200$ nm, $n_\lambda = 1.5$; $\Phi_1 = 6\pi$ and $\Phi_2 = 12\pi$, the wavelength of the O-th diffracted light is 516.7 nm for an axial ray ($\alpha' = 0°$ but is 492.3 nm for an off-axis ray ($\alpha' = 20°$), thus causing a shift of about 24 nm.

The telecentric imaging optical system 2 is employed for avoiding the above-mentioned drawback resulting from the image angle. The telecentric imaging optical system has the entrance pupil on the front focal plane as shown in FIG. 4, so that the exit pupil is present at an infinite distance. Thus all the principal rays, including that corresponding to the image angle $\alpha$, emerge parallel to the optical axis. Consequently the emerging angle $\alpha'$ from the exit pupil is always zero regardless of the image angle $\alpha$. The distance from the blazed diffraction grating 3 to the face of the 3-line sensor 4 is always $l_0$ regardless of the image angle $\alpha$, and $\Phi_i$ remains always constant because the emerging angle $\alpha'$ is zero. It is therefore possible to prevent the aberration in the image position in the Z-direction and in the diffracted wavelength.

In the foregoing explanation the imaging optical system 2 is assumed to be completely telecentric, but a substantially telecentric system can be employed in practice without difficulty.

For example, in a blazed diffraction grating of two-stepped structure shown in FIG. 7, with $d_1 = 3100$ nm, $d_2 = 6200$ nm, $n_\lambda = 1.5$, $\Phi_1 = 6\lambda$ and $\Phi_2 = 12\lambda$, the wavelength of the O-th order diffracted light is 516.7 nm for an axial ray ($\alpha' = 0°$) but is 511.2 nm, 503.8 nm or 492.3 nm respectively for an off-axis ray with $\alpha' = 10°$, 15° or 20°.

Thus the shift in wavelength with respect to the axial ray ($\alpha' = 0°$) is about 5 nm or less within the range of emerging angle of ±10°, and said shift is tolerable to such extent in consideration of color reproducibility. Stated differently, an imaging optical system showing telecentric property within an emerging angle range of ±10° can be employed without practical drawback.

FIG. 9 is a cross-sectional view of a second embodiment along the sub scanning plane, wherein a two-dimensional reflective blazed diffraction grating 31 is employed for obtaining a phase difference of four times or larger (for $n_\lambda = 1.5$), in comparison with the aforementioned transmissive diffraction grating. Consequently the films of the diffraction grating can be made thinner and are easier to prepare.

The telecentric imaging optical system employed in the foregoing embodiments is a reduction optical system, but the same advantage can be attained with a same-size optical system.

For example a Selfoc lens array (trade name) 11 shown in FIG. 10 constitutes a telecentric optical system capable of providing a same-size erect image, and can provide the same advantage as in the first embodiment, when employed as the imaging optical system. FIGS. 10A and 10B show a third embodiment of the image reading device of the present invention, seen respectively in a main scanning plane and a sub-scanning plane.

As explained in the foregoing, the present invention provides an image reading device adapted for realizing a compact and inexpensive color image reading apparatus, which forms, respectively on linear sensor arrays of a sensor, images separated satisfactorily in position and in color without aberrations in the image positions or in the diffracted wavelength even for a wide image reading width.

I claim:

1. An image reading device comprising:
   a plural-line sensor comprising plural linear sensor arrays formed on a substrate;
   a telecentric imaging optical system for forming an image of an object on said sensor; and
   a blazed diffraction grating positioned in the optical path between said imaging optical system and said sensor and adapted to seperate the light from the object into plural color components and to guide the color-separated light to respectively corresponding sensor arrays.

2. An image reading device according to claim 1, wherein said plural-line sensor comprises a monolithic three-line sensor having three linear sensor arrays which are mutually separated by a finite distance in a direction perpendicular to the direction of array of said sensor arrays.

3. An image reading device according to claim 2, wherein said object is scanned in a sub-scanning direction which is perpendicular to the array direction of said sensor arrays.

4. An image reading device according to claim 3, wherein a sensor-bearing surface of said monolithic 3-line sensor is positioned parallel to said sub-scanning direction.

5. An image reading device according to claim 1, wherein said telecentric imaging optical system comprises a reduction optical system.

6. An image reading device according to claim 1, wherein said blazed diffraction grating comprises a linear blazed diffraction grating.

7. An image reading device according to claim 1, wherein said telecentric imaging optical system directs a principal ray of a light beam coming from a peripheral area of a finite image reading width to enter said blazed diffraction grating perpendicularly.

8. An image reading device according to claim 1, wherein said blazed diffraction grating comprises a transmissive type.

9. An image reading device according to claim 1, wherein said blazed diffraction grating comprises reflective type.

10. An image reading device according to claim 1, wherein said imaging optical system provides a same-size erect image.

11. An image reading device according to claim 1, wherein said imaging optical system shows a telecentric property within an emerging angle range of ±10%.

12. An image reading device according to claim 1, wherein said telecentric imaging optical system has an entrance pupil on a front focal plane and all principal rays emerge parallel to an optical axis.

13. An image reading device comprising:
    a plural-line sensor comprising plural linear sensor arrays formed on a substrate;
    a telecentric imaging optical system for forming an image of an object on said sensor; and
    a blazed diffraction grating positioned in an optical path between said imaging optical system and said sensor and adapted to separate the light from the object into plural color components.

14. An image reading device according to claim 13, wherein said plural-line sensor comprises a monolithic three-line sensor having three linear sensor arrays which are mutually separated by a finite distance in a direction perpendicular to an array direction of said sensor arrays.

15. An image reading device according to claim 14, wherein said object is scanned in a sub-scanning direction which is perpendicular to the array direction of said sensor arrays.

16. An image reading device according to claim 15, wherein a sensor-bearing surface of said monolithic three-line sensor is positioned parallel to said sub-scanning direction.

17. An image reading device according to claim 13, wherein said telecentric imaging optical system comprises a reduction optical system.

18. An image reading device according to claim 13, wherein said blazed diffraction grating comprises a linear blazed diffraction grating.

19. An image reading device according to claim 13, wherein said telecentric imaging optical system directs a principal ray of a light beam coming from a peripheral area of a finite image reading width to enter said blazed diffraction grating perpendicularly.

20. An image reading device according to claim 13, wherein said blazed diffraction grating comprises a transmissive type grating.

21. An image reading device according to claim 13, wherein said blazed diffraction grating comprises a reflective type grating.

22. An image reading device according to claim 13, wherein said imaging optical system provides a same-size erect image.

23. An image reading device according to claim 13, wherein said imaging optical system has a telecentric property within an emerging angle range of ±10°.

24. An image reading device according to claim 13, wherein said telecentric imaging optical system has an entrance pupil on a front focal plane and all principal rays emerge parallel to an optical axis.

* * * * *

UNITED STATES PATENT AND TRADEMARK OFFICE
CERTIFICATE OF CORRECTION

PATENT NO. : 5,187,358　　　　　　　　　　　　　Page 1 of 2
DATED　　　: February 16, 1993
INVENTOR(S) : SETANI It is certified that error appears in the above-indentified patent and that said Letters Patent is hereby corrected as shown below:

COLUMN 2

Line 38, "one-dimensional" should read --two dimensional--.

COLUMN 4

Line 38, "($\alpha'=0°$" should read --($\alpha'=0°$)--.
　　　Line 62, "$\Phi_1=6\lambda$ and $\Phi_2=12\lambda$," should read --$\Phi_1=6\pi$ and $\Phi_2=12\pi$,--.

UNITED STATES PATENT AND TRADEMARK OFFICE
CERTIFICATE OF CORRECTION

PATENT NO. : 5,187,358
DATED : February 16, 1993
INVENTOR(S) : SETANI

It is certified that error appears in the above-indentified patent and that said Letters Patent is hereby corrected as shown below:

COLUMN 5

Line 7, "sub scanning" should read --sub-scanning--.
Line 19, "example" should read --example,--.
Line 45, "seperate" should read --separate--.
Line 62, "3-line" should read --three-line--.

COLUMN 6

Line 9, "comprises" should read --comprises a--.
Line 16, "±10%." should read --10°.--.

Signed and Sealed this

First Day of March, 1994

BRUCE LEHMAN

Attest:

Attesting Officer

Commissioner of Patents and Trademarks